(12) United States Patent
Schwabl et al.

(10) Patent No.: US 10,634,263 B2
(45) Date of Patent: Apr. 28, 2020

(54) VALVE DEVICE

(71) Applicant: Sonderhoff Engineering GmbH, Dornbirn (AT)

(72) Inventors: Christian Schwabl, Bregenz (AT); Guenther Baldauf, Hohenweiler (AT); Mario Metzler, Lustenau (AT)

(73) Assignee: HENKEL AG & CO. KGAA, Dusseldorf (DE)

( * ) Notice: Subject to any disclaimer, the term of this patent is extended or adjusted under 35 U.S.C. 154(b) by 171 days.

(21) Appl. No.: 15/740,251

(22) PCT Filed: Jun. 28, 2016

(86) PCT No.: PCT/AT2016/050235
§ 371 (c)(1),
(2) Date: Dec. 27, 2017

(87) PCT Pub. No.: WO2017/004642
PCT Pub. Date: Jan. 12, 2017

(65) Prior Publication Data
US 2018/0187795 A1 Jul. 5, 2018

(30) Foreign Application Priority Data
Jul. 3, 2015 (AT) .................. A 435/2015

(51) Int. Cl.
*F16K 31/128* (2006.01)
*F16K 31/126* (2006.01)
(Continued)

(52) U.S. Cl.
CPC .......... *F16K 31/128* (2013.01); *F02D 19/061* (2013.01); *F02D 19/0652* (2013.01);
(Continued)

(58) Field of Classification Search
CPC .. F16K 31/128; F16K 31/165; F16K 31/1268; F02D 41/0025; F02D 41/20;
(Continued)

(56) References Cited

U.S. PATENT DOCUMENTS

| 3,241,569 A | 3/1966 | Sully et al. |
| 3,707,985 A | 1/1973 | Hasse et al. |

(Continued)

FOREIGN PATENT DOCUMENTS

| DE | 43 06 072 | 9/1994 |
| DE | 195 42 797 | 8/2004 |

(Continued)

OTHER PUBLICATIONS

International Search Report dated Dec. 16, 2016 in International (PCT) Application No. PCT/AT2016/050235.

*Primary Examiner* — Eric Keasel
(74) *Attorney, Agent, or Firm* — Wenderoth, Lind & Ponack, L.L.P.

(57) ABSTRACT

A valve device for liquids, especially for liquid plastic constituents of single- or multiple-constituent plastic mixtures, includes a valve housing with a liquid inlet and a metering valve, which has a discharge opening that can be closed by a closure element, a pressure control device acting on the liquid in the liquid inlet and comprising a control membrane which acts on the closure element. A shut-off diaphragm separates the pressure control device from the liquid inlet, and the pressure control device comprises a fluid-tight control chamber which is at least partially arranged in the valve housing, for storing a substantially incompressible fluid. A pressure generating device allows the control membrane to be subjected to pressure by the incompressible fluid arranged in the control chamber.

22 Claims, 4 Drawing Sheets

(51) Int. Cl.
*F16K 31/165* (2006.01)
*F02D 19/06* (2006.01)
*F02D 41/00* (2006.01)
*F02D 41/20* (2006.01)
*F02D 41/38* (2006.01)

(52) U.S. Cl.
CPC ..... *F02D 19/0689* (2013.01); *F02D 41/0025* (2013.01); *F02D 41/20* (2013.01); *F02D 41/2096* (2013.01); *F16K 31/1268* (2013.01); *F16K 31/165* (2013.01); *F02D 2041/2017* (2013.01); *F02D 2041/389* (2013.01); *F02D 2200/0611* (2013.01); *Y02T 10/36* (2013.01)

(58) Field of Classification Search
CPC ............. F02D 41/2096; F02D 19/0652; F02D 19/061; F02D 19/0689; F02D 2200/0611; F02D 2041/389; F02D 2041/2017; Y02T 10/36
See application file for complete search history.

(56) References Cited

U.S. PATENT DOCUMENTS

| | | | |
|---|---|---|---|
| 4,237,931 A | 12/1980 | Rafaely | |
| 4,247,077 A * | 1/1981 | Banick | F16K 31/1262 251/25 |
| 4,688,944 A | 8/1987 | Mumenthaler | |
| 4,809,737 A | 3/1989 | Mumenthaler | |
| 5,758,862 A | 6/1998 | Sturman | |
| 6,062,532 A * | 5/2000 | Gurich | F01L 9/04 137/625.65 |
| 6,354,319 B1 | 3/2002 | Mooney | |
| 6,460,779 B1 | 10/2002 | Boecking | |
| 6,494,231 B1 | 12/2002 | Fetz et al. | |
| 8,381,761 B2 | 2/2013 | Ré | |
| 9,309,987 B2 | 4/2016 | Barrett et al. | |
| 2010/0294970 A1 | 11/2010 | Ré | |
| 2012/0305822 A1 | 12/2012 | Barrett et al. | |
| 2015/0076746 A1 | 3/2015 | Handschuh et al. | |
| 2015/0167859 A1 | 6/2015 | Barrett et al. | |

FOREIGN PATENT DOCUMENTS

| | | |
|---|---|---|
| EP | 0 300 081 | 1/1989 |
| EP | 1 115 972 | 7/2001 |
| EP | 1 123 155 | 8/2001 |
| EP | 2 023 025 | 2/2009 |
| EP | 2 256 391 | 12/2010 |
| EP | 2 848 387 | 3/2015 |
| JP | 59-56471 | 4/1984 |
| JP | 6-40551 | 5/1994 |
| JP | 2001-176361 | 6/2001 |
| WO | 00/23180 | 4/2000 |
| WO | 2011/024771 | 3/2011 |
| WO | 2012/154924 | 11/2012 |

* cited by examiner

VALVE DEVICE

BACKGROUND OF THE INVENTION

The present invention concerns a valve device such as the type generally found in EP 1 123 155 B1. In that valve device, the control diaphragm is actuated pneumatically, which limits the pressure range which can be used to very low pressures or requires large transmission areas.

A valve device of the general type found in DE 195 42 797 B4 has a very large structure. Control of the force storage means is effected by manual adjustment.

SUMMARY OF THE INVENTION

The object of the invention is to provide a valve device in which the above-described problems are at least partially avoided.

The provision of a control chamber which is at least partially arranged in the valve housing for a substantially incompressible fluid (for example a liquid or a highly compressed gas) makes it possible to enlarge the pressure range which can be used to much higher pressures than in the state of the art without large transmission areas being required. The invention affords pressure ranges of up to 100 bars instead of about 25 bars as in the state of the art. As the substantially incompressible fluid functions as a transmission fluid for the pressure generated by the pressure generating device, the pressure generating device can be arranged in any desired fashion in relation to the closure element, which allows advantageous structural configurations.

The provision of a controllable relief device by which the force exerted on the pressure transmission element by a force storage element can be reduced permits adjustment of the force by a control device so that manual adjustment is not required.

It should be noted that, hereinafter, the terms force and pressure are used interchangeably as conversion between force and pressure with a known area can be easily carried out.

BRIEF DESCRIPTION OF THE DRAWINGS

Embodiments of the invention are discussed with reference to the Figures in which.

DETAILED DESCRIPTION OF THE INVENTION

Figure 1:
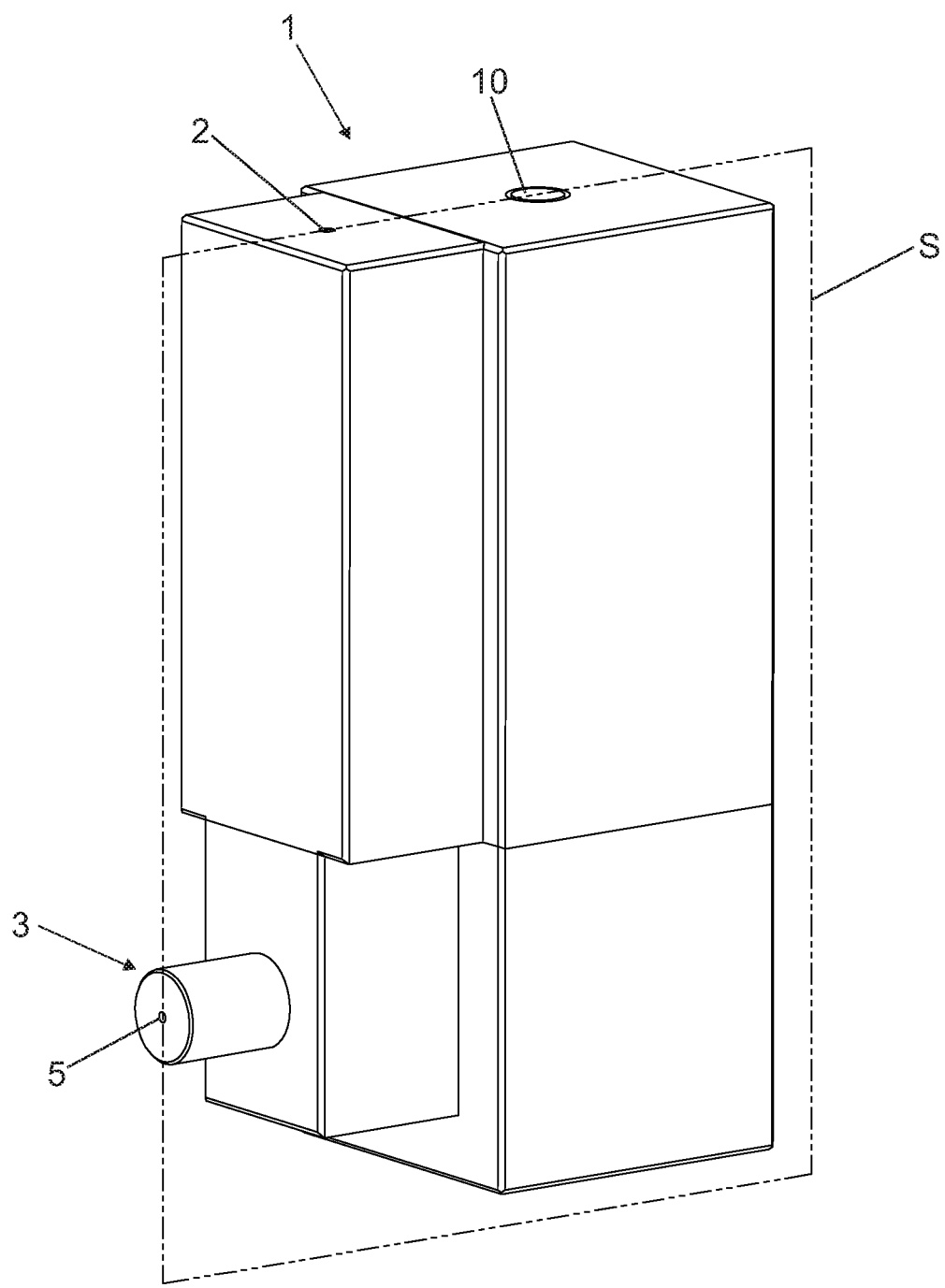
FIG. 1 is a perspective view of an embodiment of a valve device according to the invention.
Figure 2A:
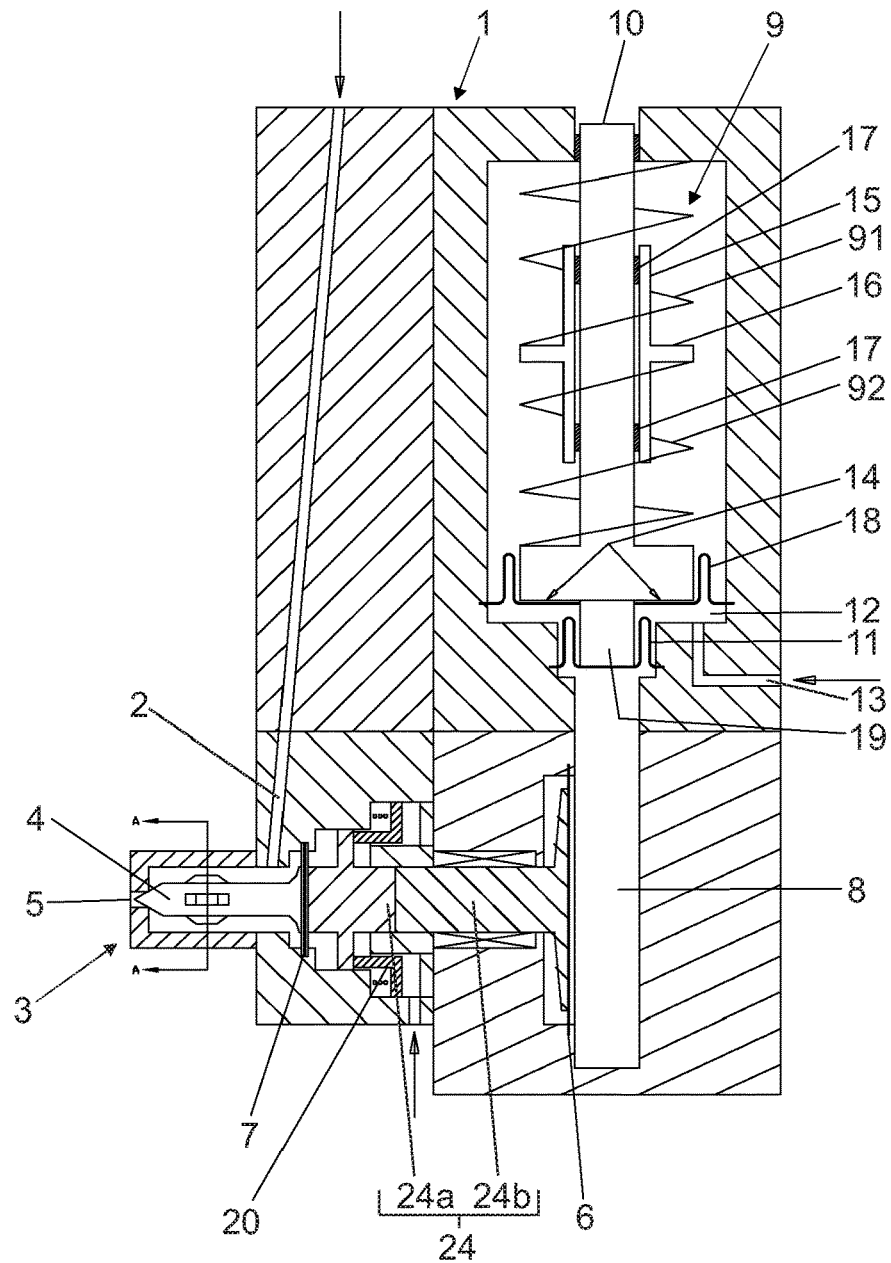
FIG. 2a is a sectional view through the valve device of FIG. 1.

FIG. 1 shows a perspective view of a proposed valve device, the sectional plane S of the sectional view of FIG. 2a being shown here.

FIG. 2a shows a valve housing 1 having a liquid feed 2 and a metering valve 3 having a discharge opening 5 closeable by a closure element 4. A liquid—for example a liquid plastic component of a single-component or multi-component plastic mixture—can be introduced into the metering valve 3 by way of the liquid feed 2.

The arrangement has a pressure control device which acts on the liquid in the liquid feed 2 or in the metering valve 3. The pressure control device includes a control diaphragm 6 acting on the closure element 4. A shut-off diaphragm 7 separates the pressure control device from the liquid feed 2 and from the metering valve 3. The shut-off diaphragm 7 is arranged at a base end of the closure element 4, the base end being remote from the discharge opening 5. The pressure control device has a fluid-tight control chamber 8 for a substantially incompressible fluid, the control chamber being arranged in this embodiment completely in the valve housing 1. As illustrated, the shut-off diaphragm 7 is in the form of a plurality of individual diaphragms which are arranged sandwich-like. That arrangement is preferred over a thicker, single-layer configuration of a diaphragm, and can be effected in relation to all diaphragms.

A pressure generating device can subject the control diaphragm 6 to pressure by an incompressible fluid arranged in the control chamber 8.

The pressure control device also includes a transmission element 24 arranged between the control diaphragm 6 and the closure element 4 for transmission of the pressure acting on the control diaphragm 6 to the closure element 4. In this example, the transmission element 24 is disposed between the control diaphragm 6 and the shut-off diaphragm 7 arranged on the closure element 4. The transmission element 24, which here has a piston shape, comprises a first element portion 24a connected to the closure element 4 and a second element portion 24b connected to the control diaphragm 6. The mutually facing ends of the first element portion 24a and the second element portion 24b bear against each other (for example, in moment-free relationship via a spherical surface arranged therebetween, not shown), so that when pressure acts on the control diaphragm 6, that pressure can be transmitted to the closure element 4 by the second element portion 24b and the first element portion 24a.

The pressure generating device has a pressure transmission element 10 which can be acted upon by a force storage element 9 (here in the form of a coil spring, it would also be possible to use another type of force storage element) and which in this embodiment is in the form of a plunger or piston. The pressure transmission element 10 acts on the control chamber 8 which here is closed off by a first rolling diaphragm 11.

A controllable relief device can reduce the force exerted on the pressure transmission element 10 by the force storage element 9. The controllable relief device here is in the form of a relief chamber 12 which can be filled with a fluid under pressure. In the present embodiment the fluid is air. The fluid can be introduced into the relief chamber 12 by a fluid opening 13 and kept under an adjustable pressure, for example by a proportional pressure regulator. In the illustrated embodiment, the fluid acts on a shoulder 14 of the pressure transmission element 10, and thus reduces the force exerted on the pressure transmission element 10 by the force storage element 9 by an adjustable amount. The force exerted on the pressure transmission element 10 by the force storage element 9 is therefore a maximum force which can be reduced to the desired extent in accordance with the respective setting of the pressure of the fluid.

The fluid pressure in the control chamber 8 arises out of the force exerted on the first rolling diaphragm 11 by the force storage element 9, less the force acting in opposition to the force storage element 9 from the relief chamber 12. A force occurring due to the liquid which flows out acts on the shut-off diaphragm 7. The dimensioning of the shut-off diaphragm 7 and the control diaphragm 6 is selected so that the lower pressure of the fluid in the control chamber 8 (for example 30 bars) is in equilibrium with the greater pressure which is produced by the liquid which flows out (for example 90 bars). That corresponds to a transmission ratio of 1:3. If pressure fluctuations occur, the shut-off diaphragm 7 and the control diaphragm 6 can move (towards the left or the right in FIG. 2*a*) in such a way that a fresh equilibrium is produced in the event of an increased or reduced gap between the closure element 4 and the discharge opening 5.

The present embodiment is fail-safe in relation to a failure of the pressure applied by the fluid insofar as, in the event of a failure, the discharge opening 5 is reliably closed by the closure element 4; if the pressure of the fluid in the relief chamber 12 fails then the force exerted on the pressure transmission element 10 by the force storage element 9 is not reduced. That force is of such a magnitude that it is sufficient to close the discharge opening 5 by the closure element 4.

In the illustrated embodiment, the force storage element 9 has a two-part structure: a first force storage element portion 91 and a second force storage element portion 92 which are connected in succession and which are respectively supported at a flange 16, that flange 16 being arranged on a slider 15 disposed displaceably on the pressure transmission element 10. The slider 15 is in contact with the pressure transmission element 10 via sliding bearings 17.

The pressure transmission element 10 has a head portion 19, and a second rolling diaphragm 18 is clamped between the head portion 19 and the shoulder 14.

Unlike the illustrated structure, the element which seals off the control chamber 8 in relation to the pressure generating device or in relation to the head portion 19 of the pressure transmission element 10 of the pressure generating device or the element sealing off the relief chamber 12 in relation to the shoulder 14 of the pressure transmission element 10 does not have to be in the form of a rolling diaphragm. Alternatively, it is possible to use flat diaphragms or piston seals.

A preferably pneumatically actuable adjusting element 20 is provided for completely closing the discharge opening 5 by the closure element 4. If, as described above, failure of the pneumatic system occurs, reliable closure of the discharge opening 5 by the adjusting element 20 would not be guaranteed. The above-described fail-safe aspect, however, takes effect.

Figure 2B:
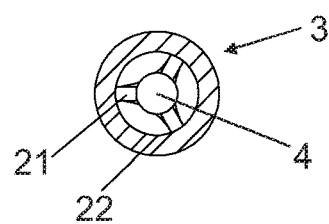
FIG. 2b is a sectional view along section line A-A in FIG. 2a, FIG. 3 shows a modified state of the valve device as shown in FIG. 2a, and FIG. 4 is a sectional view through a further embodiment of a valve device according to the invention.

FIG. 2*b* shows a sectional view through the metering valve 3 along section line A-A in FIG. 2*a*. In this embodiment, the closure element 4 has projections 21 which bear against an internal casing 22 of the metering valve 3 and by way of which it is secured against radial deviation in relation to the discharge opening 5 which in this case is nozzle-shaped.

Figure 3:
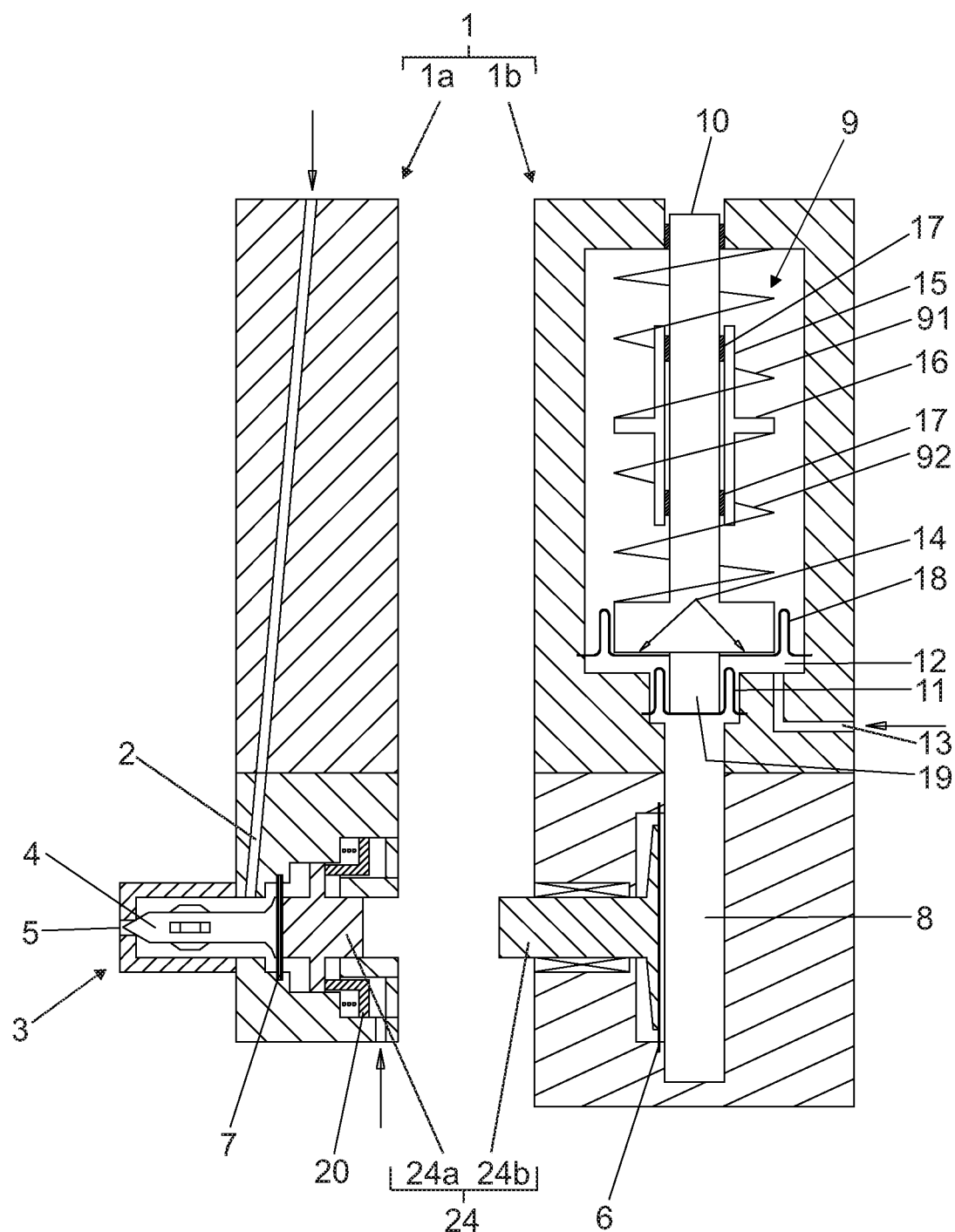

It will be seen from FIG. 3 that, in this example, the valve housing 1 includes two valve housing portions, namely a first valve housing portion 1*a* and a second valve housing portion 1*b* which can be releasably connected to the first valve housing portion 1*a*. In the illustrated view, the first valve housing portion 1*a* and the second valve housing portion 1*b* are shown detached from each other. The metering valve 3, the discharge opening 5, the closure element 4, the liquid feed 2 and the shut-off diaphragm 7 are arranged in the first valve housing portion 1*a* and the control chamber 8, the control diaphragm 6, the relief chamber 12, the pressure transmission element 10 and the force storage element 9 are arranged in the second valve housing portion 1*b*.

The first element portion 24*a* of the two-part transmission element 24 is arranged in an opening in the first valve housing portion 1*a*. The second element portion 24*b* is arranged in the second valve housing portion 1*b*. A free end of the second element portion 24*b* projects out by way of the surface of the second valve housing portion 1*b*. Connection of the second valve housing portion 1*b* to the first valve housing portion 1*a* can be facilitated by the free end of the second element portion 24*b* being introduced into the opening in the first valve housing portion 1*a*.

Figure 4:
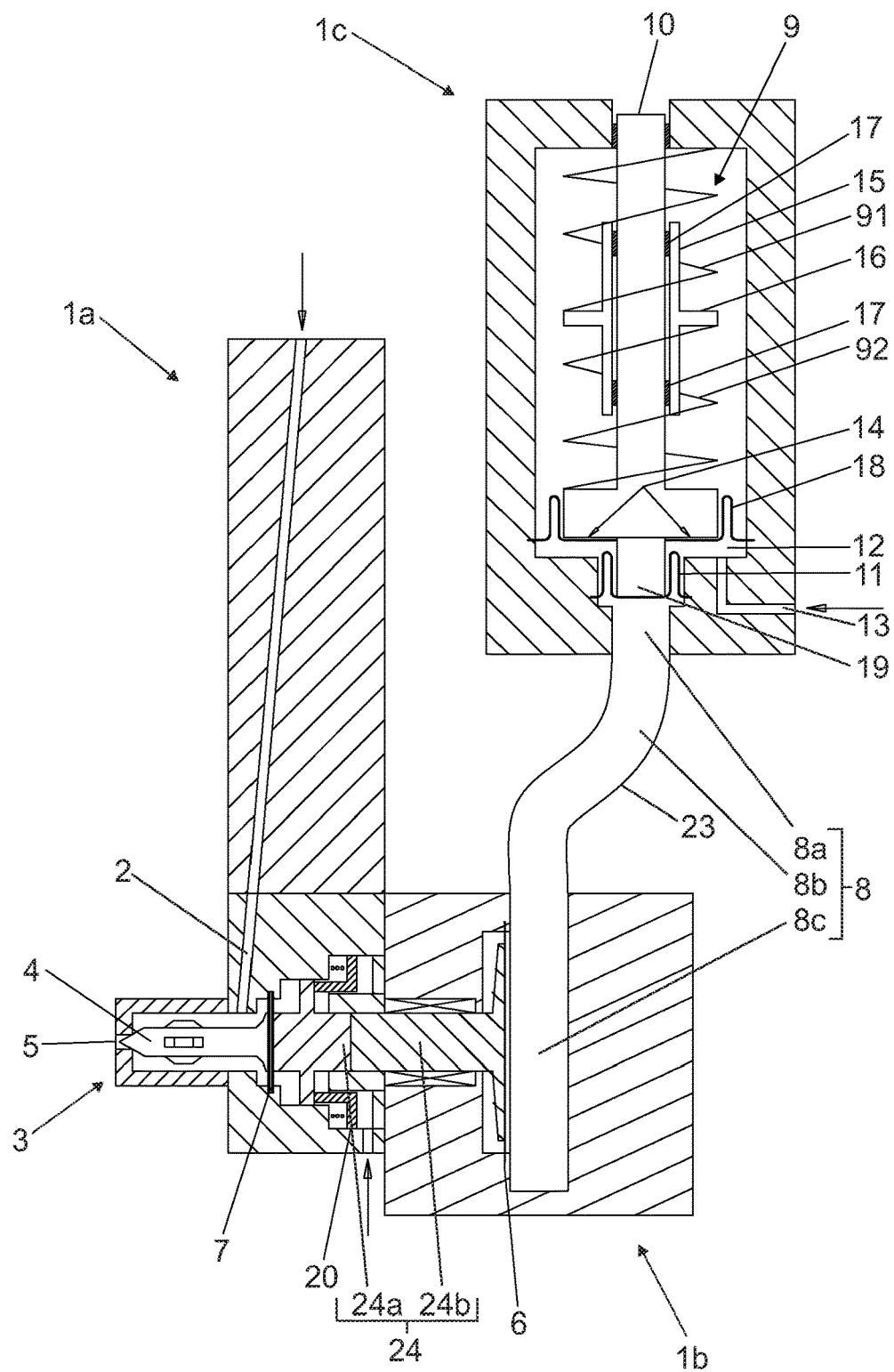

FIG. 4 shows a sectional view as in FIG. 2*a* illustrating a further embodiment of a proposed valve device. In this example, the valve device includes a valve housing 1 which has a three-part structure, including a first valve housing portion 1*a*, a second valve housing portion 1*b*, and a third valve housing portion 1*c*. Arranged in the first valve housing portion 1*a* are the metering valve 3, the discharge opening 5, the closure element 4, the liquid feed 2, the shut-off diaphragm 7 and the first element portion 24*a* of the two-part transmission element 24. Connected to the first valve housing portion 1*a* is the second valve housing portion 1*b* in which the second element portion 24*b*, the control diaphragm 6, and a third control chamber region 8*c* of the control chamber 8 are arranged. The pressure generating device (pressure transmission element 10, force storage element 9), the relief device (relief chamber 12), and a first control chamber region 8*a* are arranged in the third valve housing portion 1*c*. The first rolling diaphragm 11 which is also arranged in the third valve housing portion 1*c* delimits the first control chamber region 8*a* in relation to the pressure generating device. The first control chamber region 8*a* is connected to the third control chamber region 8*c* in the second valve housing portion 1*b* by a conduit 23 which forms a second control chamber region 8*b*. In this example, the first control chamber region 8*a*, the second control chamber region 8*b*, and the third control chamber region 8*c* jointly form the control chamber 8 of the valve device.

LIST OF REFERENCES

1 valve housing
1*a* first valve housing portion
1*b* second valve housing portion
1*c* third valve housing portion
2 liquid feed
3 metering valve
4 closure element
5 discharge opening
6 control diaphragm
7 shut-off diaphragm
8 control chamber
8*a* first control chamber region
8*b* second control chamber region
8*c* third control chamber region
9 force storage means
91 first force storage means
92 second force storage means
10 pressure transmission element
11 first rolling diaphragm
12 relief chamber
13 fluid opening
14 shoulder
15 slider
16 flange
17 sliding bearing
18 second rolling diaphragm
19 head portion of the pressure transmission element 10

20 adjusting element
21 projections
22 internal casing
23 conduit
24 transmission element
24a first element portion
24b second element portion

The invention claimed is:

1. A valve device for liquid plastic components of single-component or multi-component plastic mixtures, comprising
a valve housing having a liquid feed,
a metering valve having a discharge opening closeable by a closure element,
a pressure control device acting on the liquid in the liquid feed, the pressure control device including:
a control diaphragm acting on the closure element,
a transmission element between the control diaphragm and the closure element for transmitting a pressure acting on the control diaphragm to the closure element, and
a fluid-tight control chamber with an incompressible fluid therein, the fluid-tight control chamber being located at least partially in the valve housing;
a shut-off diaphragm arranged at the closure element for separating the pressure control device from the liquid feed, and
a pressure generating device including a force storage element and a pressure transmission element to be acted upon by the force storage element, the pressure generating device being configured to act upon the incompressible fluid such that the control diaphragm can be acted upon with pressure via the incompressible fluid in the control chamber.

2. The valve device as set forth in claim 1, wherein the transmission element is arranged between the control diaphragm and the shut-off diaphragm.

3. The valve device as set forth in claim 1, wherein the control chamber is closed off from the pressure generating device by a seal.

4. The valve device as set forth in claim 3, wherein the seal is a rolling diaphragm.

5. The valve device as set forth in claim 1, wherein the force storage element is a coil spring.

6. The valve device as set forth in claim 1, wherein the force storage element has an at least two-part configuration.

7. The valve device as set forth in claim 6, wherein the force storage element includes a first force storage element portion and a second force storage element portion connected in succession.

8. The valve device as set forth in claim 7, wherein the first force storage element portion and the second force storage element portion are each supported at a flange of a slider arranged displaceably on the pressure transmission element.

9. The valve device as set forth in claim 1, wherein the valve housing has an at least two-part configuration.

10. The valve device as set forth in claim 9, wherein the valve housing includes a first valve housing portion and a second valve housing portion, wherein the first valve housing portion is releasably connected to the second valve housing portion.

11. The valve device as set forth in claim 10, wherein the metering valve, the discharge opening, the closure element, the liquid feed, and the shut-off diaphragm are arranged in the first valve housing portion.

12. The valve device as set forth in claim 10, wherein the control diaphragm and the control chamber are arranged in the second valve housing portion.

13. The valve device as set forth in claim 12, wherein the pressure generating device is also arranged in the second valve housing portion.

14. The valve device as set forth in claim 10, wherein the valve housing includes a third valve housing portion in which the pressure generating device and a first control chamber region are arranged, the control diaphragm and a third control chamber region being arranged in the second valve housing portion, the third control chamber region being connected to the first control chamber region via a conduit forming a second control chamber region, wherein the first control chamber region, the second control chamber region, and the third control chamber region jointly form the control chamber.

15. The valve device as set forth in claim 1, wherein the pressure generating device further includes a controllable relief device configured to reduce the force exerted on the pressure transmission element by the force storage element.

16. The valve device as set forth in claim 15, wherein the relief device includes a relief chamber.

17. The valve device as set forth in claim 16, wherein a fluid opening opens into the relief chamber, the fluid opening allowing a fluid under pressure to be introduced into the relief chamber.

18. The valve device as set forth in claim 17, wherein the fluid under pressure is air.

19. The valve device as set forth in claim 16, wherein the pressure transmission element has a shoulder which delimits the relief chamber.

20. The valve device as set forth in claim 16, wherein the relief chamber is at least partially closed off from the pressure transmission element by a seal.

21. The valve device as set forth in claim 20, wherein the seal is a rolling diaphragm.

22. The valve device as set forth in claim 1, wherein the shut-off diaphragm is arranged at a base end of the closure element remote from the discharge opening.

* * * * *